United States Patent [19]

No

[11] Patent Number: 5,612,947
[45] Date of Patent: Mar. 18, 1997

[54] APPARATUS AND METHOD FOR FAST CHANGEOVER IN DUPLEX SYSTEM

[75] Inventor: Chang H. No, Kyoungki-do, Rep. of Korea

[73] Assignee: Hyundai Electronics Industries Co., Ltd., Rep. of Korea

[21] Appl. No.: 447,790

[22] Filed: May 23, 1995

[30] Foreign Application Priority Data

Jun. 30, 1994 [KR] Rep. of Korea ............... 94-15645

[51] Int. Cl.⁶ .................................................. H04J 1/16
[52] U.S. Cl. .................................... 370/228; 370/276
[58] Field of Search ......................... 370/16, 24, 28, 370/29, 31, 32, 16.1, 94.1, 94.2, 82, 83; 340/827, 825.5; 395/181, 182.04, 183.22, 182.2, 183.17, 183.13; 379/221; 385/4, 1, 2, 7, 8, 27

[56] References Cited

U.S. PATENT DOCUMENTS 5,123,008  6/1992  Beesley .................................. 370/24
5,253,309  10/1993  Nazarathy et al. ................... 385/4

*Primary Examiner*—Douglas W. Olms
*Assistant Examiner*—Dang Ton
*Attorney, Agent, or Firm*—Merchant, Gould, Smith, Edell, Welter & Schmidt

[57] ABSTRACT

An apparatus and method for fast changeover in a duplex system are disclosed. The apparatus and method enhance a processing speed, by verifying the state of a pair side by using an interrupt method, and simultaneously, by separating a control register and a state register so as to verify a fail position and content, and change over exactly according to a position of a unit to be changed over and to fail state information by including a group/unit address and the fail state information in a control register and a state register.

2 Claims, 3 Drawing Sheets

5,612,947

APPARATUS AND METHOD FOR FAST CHANGEOVER IN DUPLEX SYSTEM

BACKGROUND OF THE INVENTION

The present invention relates to an apparatus and method for a fast changeover in a duplex system, and more particularly to an apparatus and method for a fast changeover in a duplex system, by which one system is changed over fast to the other system when either of one system of a duplex system in an optical CATV system fails.

In a conventional changeover method for a duplex system, to verify the state of a self side in an active state, the information of a pair side is stored in a particular area of a register or a memory, and the content stored in the memory area is accessed in a polling manner to interpret a state so that restoration operation is processed according to a fail state of the system. However, using the above conventional method causes a complicated structure of a processor and other circuit to recognize the pair state, and also, requires lots of manufacturing cost. Also, when multiple units or groups are to be checked, the whole system breaks down before being changed over due to a low processing speed. Thus, the liability of the duplex system becomes low, and the expansion of a large system, such as an optical CATV, becomes impossible.

On the other hand, as a changeover technology used for CATV, there is one for example that is disclosed in U.S. Pat. No. 5,253,309. The disclosed optical system includes at least one optical input port for receiving an optical signal from an optical source, a modulation port for receiving the optical signal from the optical source, an optical modulator having complementary output ports, and an optical source, wherein complementary modulated output signals are applied at least to a single optical receiver at the other end of an optical transmission link. This is for maintaining a particular level by modulating an optical signal into a complementary form in the optical modulator to reduce the S/N ratio of the system, and separately providing the modulated signal to two separate optical receivers.

In an embodiment, two complementary signals are provided to the separate optical receivers, or to a signal balanced receiver, thereby an optically modulated signal is modulated. The S/N ratio is increased by doubling a signal level. In the embodiment, a signal optical transmission channel is used, and the two optically modulated signals are separated in polarization so as to be capable of being separately detected on the receiving end of the link, and feedback means is used to insure proper polarization state for the two complementary signals.

However, the aforesaid changeover technology is for separating a signal itself, thus, the technology cannot be applied to a changeover technology where a signal itself is exchanged.

SUMMARY OF THE INVENTION

To solve the above problems, it is an object of the present invention to provide an apparatus and method for fast changeover in a duplex system, which enhance a processing speed by verifying the state of a pair side by using an interrupt method, and simultaneously, by separating a control register and a state register so as to verify a fail position and content, and also, change over exactly according to a position of a unit to be changed over and to fail state information by including a group/unit address and the fail state information in a control register and a state register.

Accordingly, to achieve the above object, there is provide an apparatus for a fast changeover in a duplex system comprising: a control register being composed of eight bits in order of which one bit is for a duplex system mode, of which one bit is for a state of the mode, of which one bit is for an operation state of the mode state, and of which three bits and two bits are respectively for each address of a group/unit which operates in being linked to the duplex system; and a state register being composed of eight bits in order of which one bit is for a connection state of each unit/group based on the information of the control register, of which three bits are for the information of a fail position, and of which four bits are for the information of a fail state, wherein a pair of the registers are separately configured, and each state of the control registers and state registers are read/written by a control signal of each CPU in each CPU.

To achieve the above object, there is provide a method for a fast changeover in a duplex system comprising the steps of: setting one side and the other side as an active state and a standby state, respectively, and verifying the state of the setting by control registers; checking each mode of the control register in a self side in an active state, when the self side is in a normal operation, a pair side in a standby state checking by polling continuously the content of a state register in a self side in an active state, and if the self side is in a fail state, a group/unit address in a fail state is decoded; changing over to the pair side in a standby state; and resetting and dispatching the state of the control register in a self side in an active state, and analyzing fail kind and state according to the content of the state register so as to display and store the analyzed information, and then checking the mode of the control register in a pair side, being returned to an active state, and the operation is repeated, wherein the steps are repeated.

To achieve the above object, there is provided a method for a fast changeover in a duplex system comprising the steps of: setting one side and the other side as an active state and a standby state, respectively, and verifying the state of the setting by control registers; checking each mode of the control register in a self side in an active state, when the self side is in a normal operation, a pair side in a standby state checking by polling continuously the content of a state register in a self side in an active state, and if the self side is in a fail state, a group/unit address in a fail state is decoded; changing over to the pair side in a standby state; and resetting and dispatching the state of the control register in a self side in an active state, and analyzing fail kind and state according to the content of the state register so as to display and store the analyzed information, and then checking the mode of the control register in a pair side, being returned to an active state, and the operation is repeated, wherein said steps are repeated.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
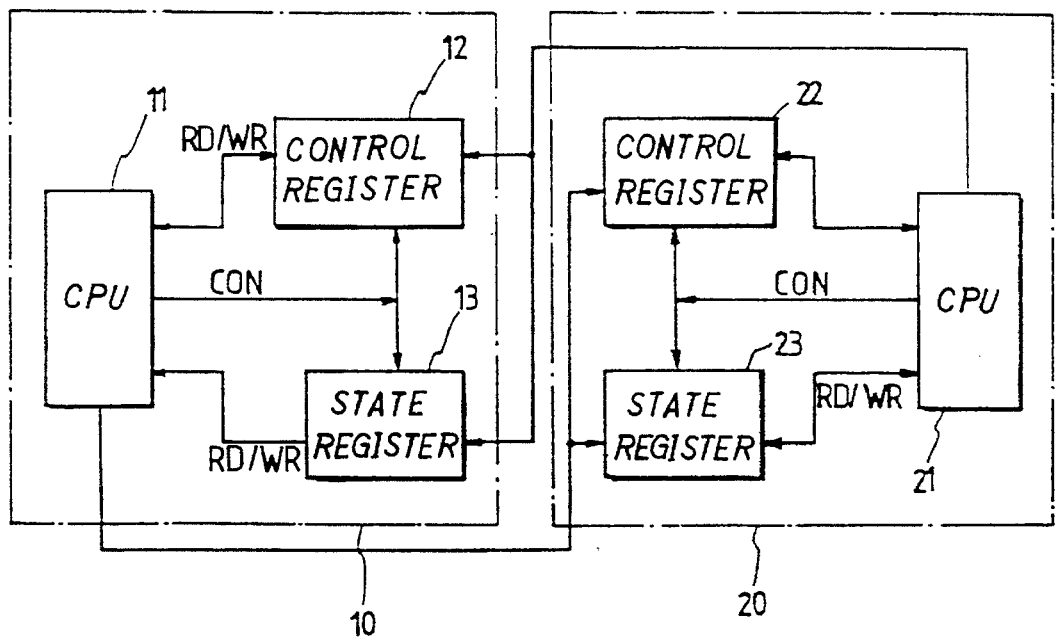
FIG. 1 is a block diagram illustrating the structure of an apparatus for a fast changeover in a duplex system according to the present invention.
Figure 2A:
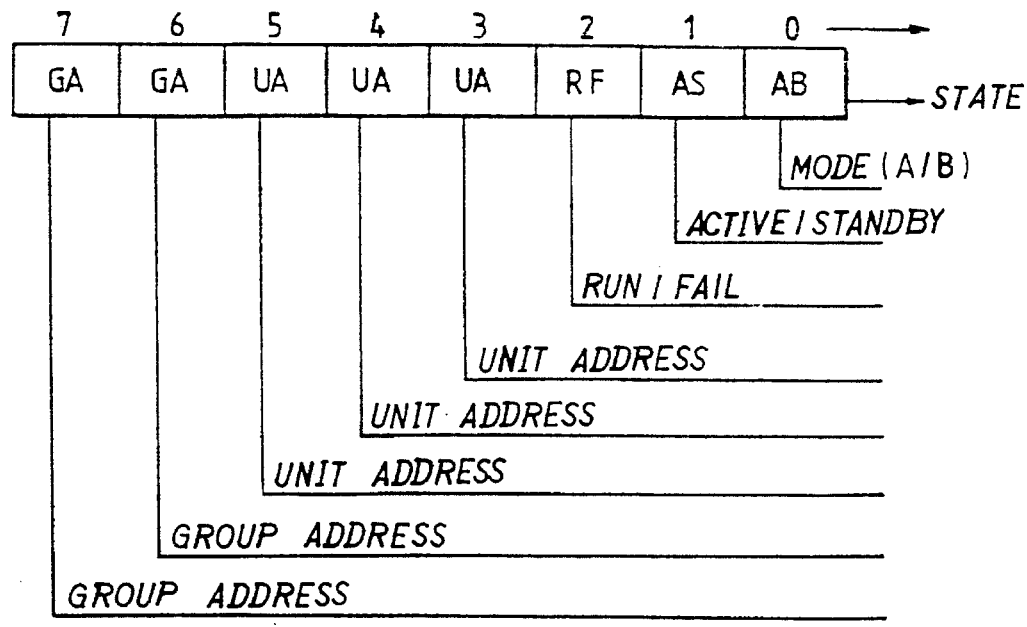
FIG. 2A is a view illustrating the structure of the control register of FIG. 1.
Figure 2B:
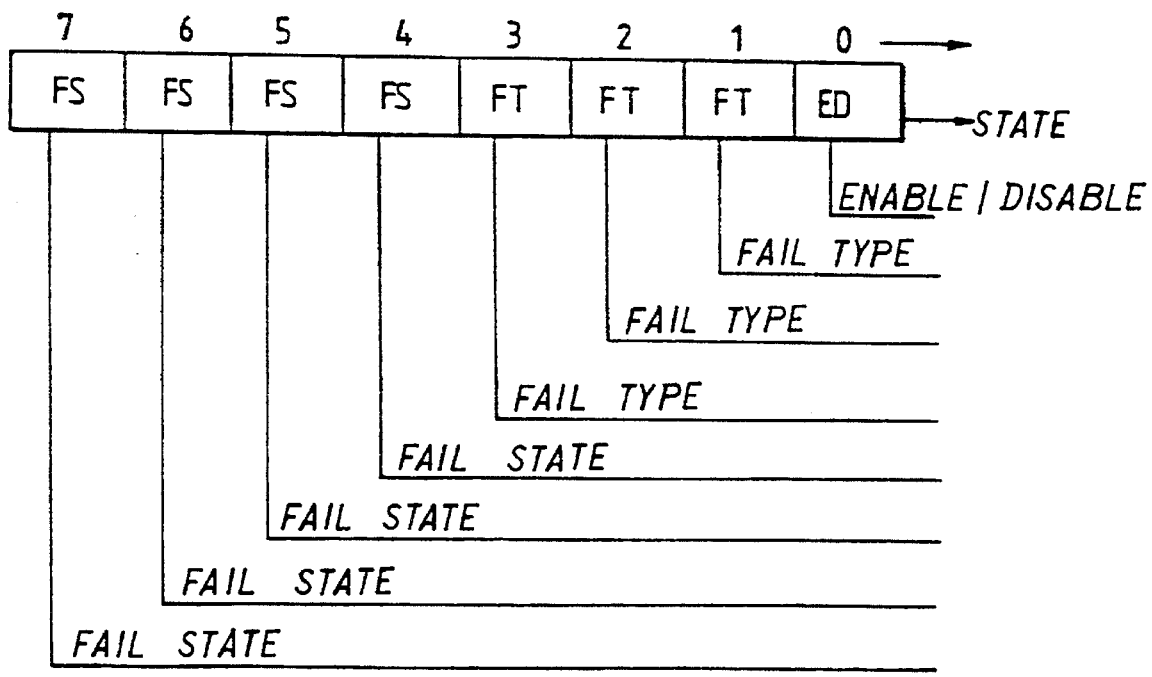
FIG. 2B is a view illustrating the structure of the state register of FIG. B.

FIG. 1 shows an apparatus for a fast changeover of a duplex system of the present invention. By separating control registers 12 and 22 and state registers 13 and 23, the state of each control register and state register is read/written (RD/WR) by a control signal (CON) of each CPU 11 and 21. Control registers 12 and 22 and state registers 13 and 23 are composed as in FIGS. 2A and 2B.

The control register is composed of eight bits in order: one bit (zero bit) for a duplex system mode (side A/side B: AB), one bit (first bit) for the state of the mode (Active/Standby: AS), one bit (second bit) for the operation state of the aforesaid state (Run/Fail: RF) and three bit (third to five bits) and two bit (sixth to seventh bits) respectively for each address (Unit Address/Group Address: UA/GA) of a group/unit which operates in being linked to the duplex system.

The state register is composed of eight bits in order: one bit (0 bit) for the connection state (Enable/Disable: ED) of each unit/group based on the information of control register, three bits (first to third bits) for the information of a fail position (Fail Type: FT) and four bits (fourth to seventh bits) for the information of a fail state (Fail State: FS). The above pair of registers are separately configured.

The changeover operation of the above configuration is as follows.

Assuming that a side in the currently active state is side A 10, and a side in a standby state is side B 20, each CPU 11 and 21 of the side A and side B continuously and mutually read/write the state of control registers 12 and 22 and state registers 13 and 23 by a control signal (CON). Here, the control register of side B in a standby state always verifies the state of an RF-bit (second bit) of the control register in side A by CPU 11, and if the verified value signifies a fail state, accesses unit/group address UA/GA corresponding to 3–7 bits. Then, the state register verifies from the CPU the fail position and fail state stored in state register 13 in side A 10, and changes over a unit in a fail state in side A 10 to a corresponding unit in control register 22 of side B 20. Then, the state register 23 resets control register 12 in side A 10, and analyzes and stores the cause of according to the content of state register 13. When side B 20 is in an active state, the same operation is repeated.

Figure 3:
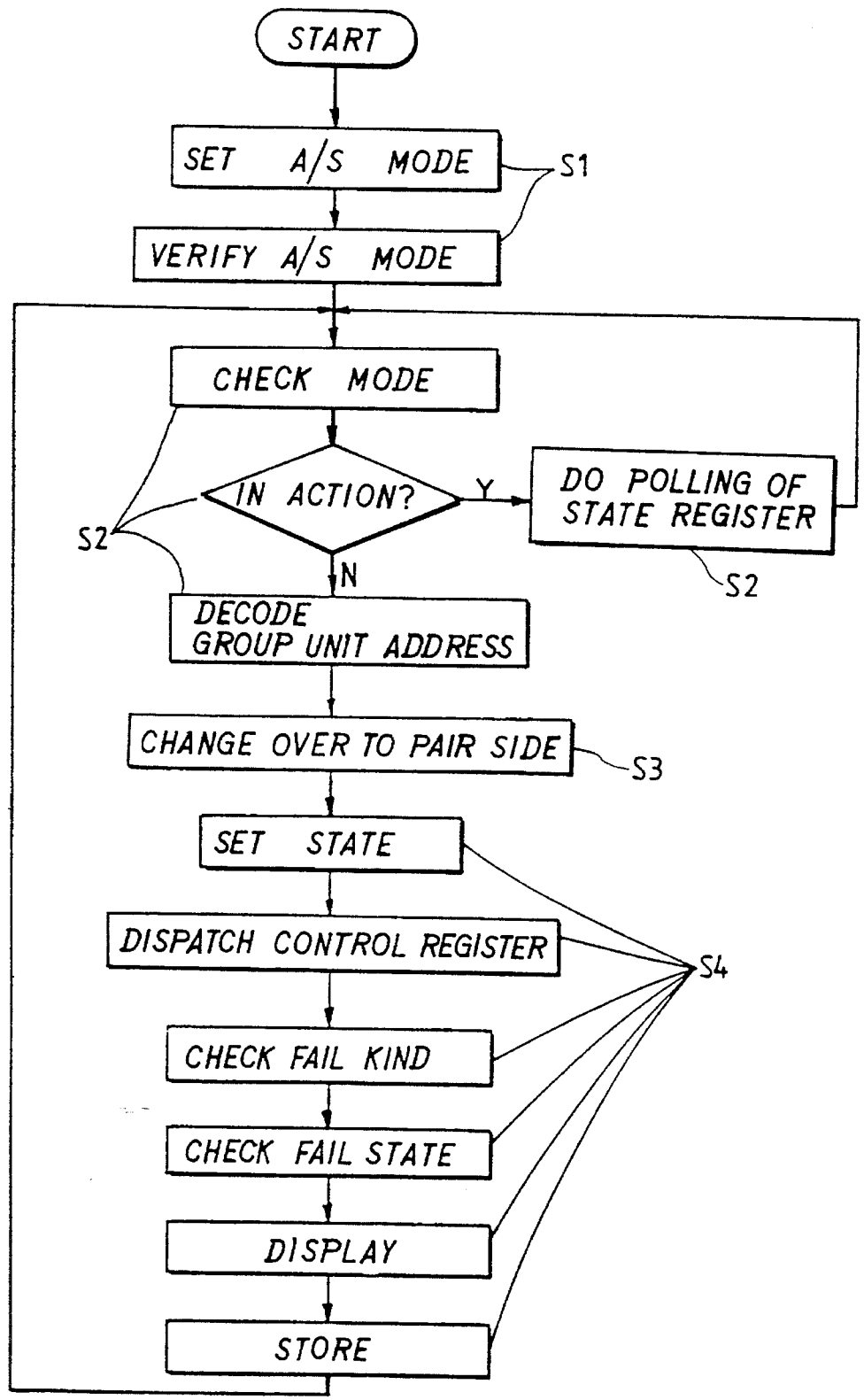
FIG. 3 is a flowchart for the operation of the apparatus for a fast changeover in a duplex system according to the present invention.

FIG. 3 shows a flowchart of the above operation. In step S1, side A 10 and side B 20 are set as an active state and a standby state, respectively, and the state of the above setting is verified by control registers 12 and 22. In step S2, each mode of control register in a self side of an active state is checked, and if the side A is in a normal operation, a pair side in a standby state checks by continuous polling of the state register content in a self side in an active state. If the self side is in a fail state, a group/unit address in a fail state is decoded. In step S3, a changeover to a pair side in a standby state occurs. After a changeover process is completed in step S3, the control register state is reset and dispatched in a self side in an active state, and the fail kind and state are analyzed according to the content of a state register so as to display and store the analyzed information, in step S4. In step S4, a control register mode in the pair side returned in an active state, is checked and continuously repeats the operation.

As described above, the present invention improves a processing speed by designing to verify a pair side state in an interruption method and simultaneously verifies a fail position and content, thereby the liability of a duplex system increases, and also, extension becomes easy and manufacturing cost is reduced by a single design of a device for fast changeover.

What is claimed is:

1. An apparatus for a fast changeover in a duplex system comprising:

a pair of control registers, each control register being composed of eight bits in order of which one bit is for a duplex system mode, of which one bit is for a state of mode, of which one bit is for an operation state of the mode state, and of which three bits and two bits are respectively for each address of a group/unit which operates in being linked to the duplex system;

a pair of state registers, each state register being composed of eight bits in order of which one bit is for a connection state of each unit/group based on the information of said control register, of which three bits are for the information of a fail position, and of which four bits are for the information of a fail state; and wherein the pair of said control registers are separately configured, the pair of said state registers are separately configured, and each state of said control registers and state registers are read/written by a control signal of each CPU in each CPU.

2. A method for a fast changeover in a duplex system having a self side and a pair side comprising the steps of:

setting the self side and the pair side as an active state and a standby state, respectively, and verifying a state of the setting by control registers;

checking each mode of the control register in the self side in the active state, when the self side is in a normal operation, the pair side in the standby state checking by polling continuously a content of a state register in the self side in the active state, and if the self side is in a fail state, a group/unit address in the fail state is decoded;

changing over to the pair side in the standby state; and resetting and dispatching the state of the control register in the self side in the active state, and analyzing fail kind and state according to the content of the state register so as to display and store analyzed information, and then checking the mode of the control register in the pair side, being returned to the active state, and the operation is repeated, wherein said steps are repeated.

* * * * *